June 11, 1935. G. B. SHANKLIN 2,004,769
MEANS FOR AND METHOD OF DETECTING AND ASCERTAINING
THE REGION OF OIL LEAKS IN CABLE SYSTEMS
Filed Sept. 6, 1929
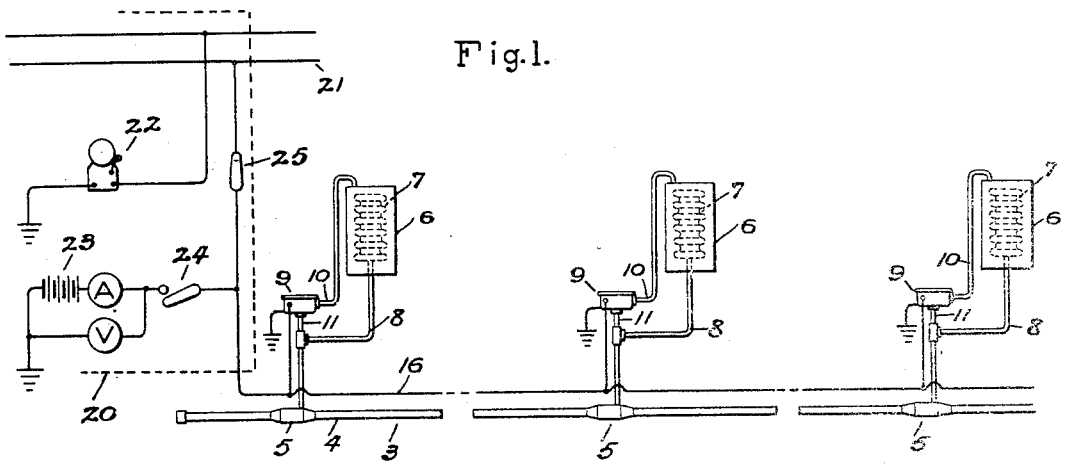
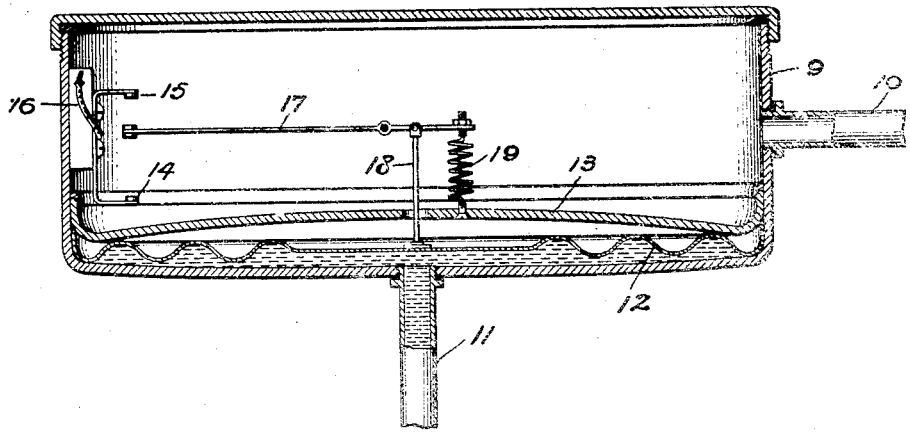
Inventor:
George B. Shanklin,
by Charles E. Tullar
His Attorney Patented June 11, 1935

2,004,769

UNITED STATES PATENT OFFICE 2,004,769

MEANS FOR AND METHOD OF DETECTING AND ASCERTAINING THE REGION OF OIL LEAKS IN CABLE SYSTEMS

George B. Shanklin, Schenectady, N. Y., assignor to General Electric Company, a corporation of New York Application September 6, 1929, Serial No. 390,819

2 Claims. (Cl. 177—311)

The present invention relates to high tension underground cable installations in which a liquid, such as oil, is used as an insulating medium. It is a prime requisite in such a system or installation that no oil shall leak out and that no air or moisture shall enter. To this end the cable is carefully covered by a lead sheath and reservoirs are connected thereto in parallel at spaced intervals for receiving oil from the cable as it expands due to rise of temperature and for feeding the oil back into the cable as it cools. Due to electrical troubles or to faulty workmanship, an oil leak may develop which may be so serious as to result in damage or even in the destruction of an expensive length of cable. At the present time the only way by which an oil leak can be detected is by inspecting the manholes in the streets and the various reservoirs, which is not only expensive in itself but consumes a great deal of time and interrupts street traffic while the manholes are open. In one installation of which I have knowledge, each of the three phases is eleven miles long and extends through a crowded city.

My invention has for its object the provision of means and a method whereby an oil leak or abnormal condition in the cable or reservoir system may be promptly detected and the reservoir nearest thereto located, and this from a suitably located station which is common to all of the reservoirs.

For a consideration of what I believe to be novel and my invention, attention is directed to the accompanying description and the claims appended thereto.

In the drawing, which is illustrative of my invention, Fig. 1 is a diagrammatic view of a cable system, either one phase of a multiphase, single conductor cable system or of a multi-core cable, and Fig. 2 is a sectional view of a differential pressure device which is responsive to changes of oil volume and oil and gas pressures within the reservoirs.

3 indicates a cable for carrying high tension electric current underground. There may be one or more insulated conductors in the cable and enclosing the same is a lead or equivalent sheath 4. The cable is divided into sections or lengths between which are so-called oil-stop, or semi-oil-stop joints 5, which prevent, or partially prevent, the migration or flow of oil from one length to the other, as is usual in such installations. Each length of cable is provided with one or more reservoirs, one being shown for each length for the sake of simplicity. The particular construction is not material to the present invention, but as shown each comprises a sealed tank or container 6, having a gas containing chamber in which is located a plurality of small cellular elements 7 which expand and contract with changes of oil pressure within the cable. The cellular elements of each reservoir are connected to the cable by properly connected pipes 8. Thus far the arrangement is standard construction.

In addition to the foregoing each reservoir has connected to it a differential pressure device which, when an oil leak occurs, causes a signal to be operated at some suitable station which is common to all of the reservoirs and which may be the main station supplying current to or receiving it from the cable. The specific construction of the device may be varied without departing from my invention. It should, however, be one that is quite sensitive and is well protected against external matter. In Fig. 2 is illustrated a suitable differential pressure device for the purpose. It comprises a sealed casing 9 having a removable cover which is properly sealed with a fluid tight gasket. The casing is connected by the pipe 10 to the gas chamber of the reservoir, and by the pipe 11 to the oil chamber of the reservoir and cable, as, for example, through the pipe 8 so as to avoid making a second connection to the casing of the stop joint. For some cases the arrangement may be modified and the pipe 11 connected to the reservoir. In some other case, it will be found desirable to connect the pipe 10 to a source of constant pressure such as the atmosphere, instead of to the gas chamber within a reservoir. The connections will be determined largely by the conditions under which the cable operates. Inside the casing is a flexible diaphragm or member 12 which is suitably corrugated to give it flexibility. One side is subjected to the pressure of the oil in the reservoir and the other side is subjected to the gas pressure within the outer container or casing. Usually the container will contain a suitable gas, the pressure of which varies as the cellular elements expand and contract with changes in volume of the oil in the reservoir. In order to protect the diaphragm against injury as the oil pressure rises, a suitably arranged disk 13 is employed which is anchored at its periphery to the inner wall of the casing. It is so shaped as to engage the high points of the corrugation of the diaphragm on a rise of oil pressure and prevent injury thereto. Inside of the casing is a pair of adjustable contacts 14 and 15 which are connected to a wire 16 which is brought out of the casing through a fluid tight bushing (not shown) and connected to the signal wire leading back to the station and normally open circuited beyond the station. It is to be noted that only a single wire 16 is employed and that it is connected to all of the differential pressure devices, also that the wire is normally open circuited. The casing 9 itself is grounded, either direct or through a resistance, to form a part of the circuit. The contact 14 comes into service when the oil pressure within the reservoir and cable is abnormally high and the contact 15 when the oil pressure is abnormally low, indicating some abnormal operating condition. Pivotally supported within the casing is an arm 17 which normally occupies some position between the two contacts. It is actuated by a rod 18 which is attached to the gas side of the diaphragm. An adjustable spring 19 is provided which acts on the contact arm in opposition to the diaphragm.

The area included within the dotted line 20 represents a suitable station and may be the main power or substation associated with the cable. It may be close to the cable or remote therefrom, depending upon the arrangement of the cable itself. Extending from the station is the conductor or wire 16 which as before stated is open-circuited and is connected to a contact in each differential pressure device. It may be laid in the same conduit with the cable, in a spare conduit or supported in any suitable way. It is connected to a source of current, for example, to one of the low tension bus bars 21 in the station, the other bus bar being connected to ground through a suitable signal device 22, which may be a bell or other device giving an audible or visual signal or both.

23 indicates a battery or other source of current supply, one side of which is grounded. It is normally inactive. In circuit therewith is an ammeter marked A, and in shunt to the battery and ammeter is a volt meter V. By means of the switch 24 the battery can be put in circuit with the signal wire when the switch 25 is open. If the system is three phase with each conductor located in its own lead sheath and having its own reservoirs, the various parts above mentioned will be duplicated wholly or in part as conditions require.

Having installed the system as above described, the total resistance of the open circuited signal wire 16 is determined by any well known method, not necessarily by the ammeter-voltmeter method shown in Fig. 1, and also the resistance from the station to each of the several reservoirs, and this information is tabulated and arranged in chart form. Assuming that an oil leak develops anywhere in the system causing an abnormal loss of oil volume in the reservoir, this will cause the arm 17 to close the contact 15 and through it and the signal wire actuate the alarm device 22, it being noted that the arm 17 is grounded through the casing of the device. The station attendant thus notified of trouble opens the switch 25 and closes the switch 24 leading from the battery to the signal wire 16. This will cause current to flow through both the ammeter and volt meter and in amount depending upon the resistance of the signal wire between the station and the reservoir when the arm 17 closed the circuit. From the meter readings it may be determined what that resistance is. A comparison of this resistance reading with the chart or table of resistances between the station and the several reservoirs will immediately show which reservoir has been depleted of its normal supply of oil, or when an abnormally high oil pressure exists, and the repair crew can be immediately sent to that reservoir to make such changes or repairs as are necessary when the character of the trouble is ascertained. This results, as will readily be appreciated, in a great saving of time, and time is a very important element when trouble occurs in any electrical installation. Moreover, it avoids the necessity of having to make frequent and regular trips of inspection, all of which costs a considerable amount of money and is otherwise objectionable.

For simplicity, the casings of the several differential pressure devices and therefore their contact arms 17 have been grounded, but the arrangement is equally advantageous when a return wire instead of the ground is used as a return circuit.

This device is equally effective in indicating other abnormal conditions in the system. For instance, assume that the reservoir casing 6 is sealed from the atmosphere and filled with a gas to a pressure above atmospheric, a commonly required condition, assume further, that a leak develops in this casing, the gas pressure will gradually be lost and the oil pressure will actuate diaphragm 12, causing contacts 14 and 17 to close and signal back to the station.

What I claim as new and desire to secure by Letters Patent of the United States is:

1. A cable system comprising lengths of cable, each having a sheath and filled with liquid insulation, joints at spaced intervals for permanently uniting the lengths of cable, liquid containing reservoirs connected through the joints to the cable to supply liquid to and receive it from the cable, each reservoir comprising a casing element having a chamber containing gas and a variable capacity element receiving liquid from the cable, in combination with means for indicating an abnormal operating condition of the cable without interrupting its operation comprising a differential device associated with each of the reservoirs, each device comprising a casing element having a chamber connected to the gas chamber of a reservoir and a member one side of which is exposed to the action of the gas and the other side to the action of the liquid insulation within the cable, stationary and movable contacts located within the gas chamber, means moved by the member for actuating the movable contact, a signal circuit including the contacts of all of the differential devices and connected to a source of current supply, and means located at a selected point comprising a signal device actuated by the current flowing in the signal circuit when the circuit of the latter is closed at one of said devices.

2. A cable system comprising lengths of cable, each having a sheath and filled with liquid insulation, joints at spaced intervals for permanently uniting the lengths of cable, liquid containing reservoirs connected through the joints to the cable to supply liquid to and receive it from the cable, each reservoir comprising a casing element having a chamber containing gas and a variable capacity element receiving liquid from the cable, in combination with means for indicating an abnormal condition of the liquid insulation within the cable and reservoirs without interrupting the operation of the cable comprising a device differentially acted upon by a body of gas and the liquid from the cable associated with each of the reservoirs and separate therefrom, a circuit controller for each of the devices comprising relatively movable contacts, operable in response to the movements of the said device, a signal circuit including all of the circuit controllers and connected to a source of current supply, and means located at a selected point comprising a signal device actuated by the current flowing in the signal circuit when the circuit of the latter is closed by one of said controllers.

GEORGE B. SHANKLIN.